US010009579B2

(12) United States Patent
Wang et al.

(10) Patent No.: US 10,009,579 B2
(45) Date of Patent: Jun. 26, 2018

(54) METHOD AND SYSTEM FOR COUNTING PEOPLE USING DEPTH SENSOR (71) Applicant: Pelco, Inc., Clovis, CA (US)

(72) Inventors: Lei Wang, Clovis, CA (US); Farzin Aghdasi, Clovis, CA (US)

(73) Assignee: PELCO, INC., Clovis, CA (US)

( * ) Notice: Subject to any disclaimer, the term of this patent is extended or adjusted under 35 U.S.C. 154(b) by 807 days.

(21) Appl. No.: 13/683,886

(22) Filed: Nov. 21, 2012

(65) Prior Publication Data

US 2014/0139633 A1 May 22, 2014

(51) Int. Cl.
*H04N 7/18* (2006.01)
*G06K 9/00* (2006.01)

(52) U.S. Cl.
CPC ........... *H04N 7/18* (2013.01); *G06K 9/00201* (2013.01); *G06K 9/00778* (2013.01)

(58) Field of Classification Search
CPC ........... G06K 9/00201; G06K 9/00778; G06K 9/00771; G06K 9/00369; G06K 9/00335; G08B 13/196; G06T 7/00; G06T 7/20; G06T 2207/20144; G06T 2207/30232
See application file for complete search history.

(56) References Cited

U.S. PATENT DOCUMENTS

| | | | |
|---|---|---|---|
| 6,771,818 B1 * | 8/2004 | Krumm .............. | G06K 9/00369 382/154 |
| 7,003,136 B1 * | 2/2006 | Harville ............. | G06K 9/00201 348/169 |
| 7,330,566 B2 * | 2/2008 | Cutler ................ | G06K 9/00348 382/103 |
| 7,359,555 B2 | 4/2008 | Porikli et al. | |
| 7,391,907 B1 | 6/2008 | Venetianer et al. | |
| 7,602,944 B2 * | 10/2009 | Campbell et al. ............ | 382/103 |
| 7,787,656 B2 * | 8/2010 | Chen .............................. | 382/103 |

(Continued)

FOREIGN PATENT DOCUMENTS

| | | |
|---|---|---|
| CN | 102122390 | 7/2011 |
| WO | WO2012023639 | 2/2012 |

(Continued)

OTHER PUBLICATIONS

Baxes, Gregory A., "Digital Image Processing Principles and Applications," (1994).

(Continued)

*Primary Examiner* — Brian Yenke
(74) *Attorney, Agent, or Firm* — Locke Lord LLP (57) ABSTRACT

A sensor system according to an embodiment of the invention may process depth data and visible light data for a more accurate detection. Depth data assists where visible light images are susceptible to false positives. Visible light images (or video) may similarly enhance conclusions drawn from depth data alone. Detections may be object-based or defined with the context of a target object. Depending on the target object, the types of detections may vary to include motion and behavior. Applications of the described sensor system include motion guided interfaces where users may interact with one or more systems through gestures. The sensor system described may also be applied to counting systems, surveillance systems, polling systems, retail store analytics, or the like.

19 Claims, 7 Drawing Sheets

(56) References Cited

U.S. PATENT DOCUMENTS

| | | | |
|---|---|---|---|
| 7,965,866 B2* | 6/2011 | Wang et al. | 382/103 |
| 8,107,676 B2 | 1/2012 | Senior | |
| 8,238,607 B2* | 8/2012 | Wang | G06K 9/00771 |
| | | | 382/103 |
| 8,306,265 B2 | 11/2012 | Fry et al. | |
| 8,406,470 B2* | 3/2013 | Jones | G06K 9/00201 |
| | | | 348/135 |
| 8,542,879 B1 | 9/2013 | Nechyba et al. | |
| 8,600,108 B2 | 12/2013 | Tang et al. | |
| 8,639,020 B1* | 1/2014 | Kutliroff et al. | 382/154 |
| 8,744,125 B2 | 6/2014 | Zhu et al. | |
| 8,769,557 B1* | 7/2014 | Terrazas | 725/12 |
| 9,001,199 B2 | 4/2015 | Sinha et al. | |
| 9,076,065 B1 | 7/2015 | Vijayanarasimhan | |
| 9,177,195 B2* | 11/2015 | Marcheselli | G06K 9/00335 |
| 9,367,733 B2* | 6/2016 | Zhu | G06K 9/00369 |
| 9,639,747 B2 | 5/2017 | Zhu et al. | |
| 2003/0107649 A1* | 6/2003 | Flickner et al. | 348/150 |
| 2003/0152267 A1 | 8/2003 | Pirim | |
| 2003/0169906 A1* | 9/2003 | Gokturk et al. | 382/115 |
| 2003/0235341 A1* | 12/2003 | Gokturk | G06K 9/00228 |
| | | | 382/243 |
| 2005/0111737 A1 | 5/2005 | Das et al. | |
| 2006/0115116 A1 | 6/2006 | Iwasaki et al. | |
| 2006/0285724 A1 | 12/2006 | Tian | |
| 2007/0019073 A1 | 1/2007 | Comaniciu et al. | |
| 2007/0047837 A1 | 3/2007 | Schwab et al. | |
| 2007/0098222 A1* | 5/2007 | Porter | G06K 9/00234 |
| | | | 382/103 |
| 2008/0166045 A1* | 7/2008 | Xu et al. | 382/170 |
| 2008/0192990 A1* | 8/2008 | Kozakaya | G06K 9/00221 |
| | | | 382/117 |
| 2008/0285802 A1 | 11/2008 | Bramblet et al. | |
| 2009/0215533 A1* | 8/2009 | Zalewski | A63F 13/00 |
| | | | 463/32 |
| 2009/0244291 A1 | 10/2009 | Saptharishi et al. | |
| 2010/0027875 A1* | 2/2010 | Hampapur et al. | 382/159 |
| 2010/0066761 A1 | 3/2010 | Tousch et al. | |
| 2010/0124357 A1 | 5/2010 | Hampapur et al. | |
| 2010/0266175 A1 | 10/2010 | Seung et al. | |
| 2010/0274746 A1 | 10/2010 | Rickert et al. | |
| 2010/0290700 A1 | 11/2010 | Yokono | |
| 2010/0329544 A1 | 12/2010 | Sabe et al. | |
| 2011/0026770 A1 | 2/2011 | Brookshire | |
| 2011/0058708 A1 | 3/2011 | Ikenoue | |
| 2011/0078133 A1 | 3/2011 | Bordawekar et al. | |
| 2011/0080336 A1* | 4/2011 | Leyvand | A63F 13/06 |
| | | | 345/156 |
| 2011/0093427 A1 | 4/2011 | Waite | |
| 2011/0143779 A1* | 6/2011 | Rowe et al. | 455/456.3 |
| 2011/0176000 A1* | 7/2011 | Budge et al. | 348/143 |
| 2011/0176025 A1 | 7/2011 | Anabuki | |
| 2011/0202310 A1 | 8/2011 | Min et al. | |
| 2011/0254950 A1 | 10/2011 | Bibby et al. | |
| 2011/0268321 A1* | 11/2011 | Hosoi | 382/103 |
| 2011/0293136 A1 | 12/2011 | Porikli | |
| 2011/0293180 A1* | 12/2011 | Criminisi | G06K 9/38 |
| | | | 382/173 |
| 2012/0020518 A1* | 1/2012 | Taguchi | G06T 7/2093 |
| | | | 382/103 |
| 2012/0026277 A1* | 2/2012 | Malzbender | H04N 7/15 |
| | | | 348/14.07 |
| 2012/0027252 A1 | 2/2012 | Liu et al. | |
| 2012/0027263 A1 | 2/2012 | Liu et al. | |
| 2012/0051588 A1* | 3/2012 | McEldowney | G03B 17/54 |
| | | | 382/103 |
| 2012/0086780 A1* | 4/2012 | Sharma et al. | 348/46 |
| 2012/0087572 A1* | 4/2012 | Dedeoglu et al. | 382/154 |
| 2012/0087575 A1* | 4/2012 | Winn et al. | 382/159 |
| 2012/0117084 A1 | 5/2012 | Tang et al. | |
| 2012/0120196 A1* | 5/2012 | Tsai et al. | 348/46 |
| 2012/0128208 A1 | 5/2012 | Leyvand et al. | |
| 2012/0148093 A1 | 6/2012 | Sharma | |
| 2012/0154373 A1 | 6/2012 | Finocchio et al. | |
| 2012/0154542 A1 | 6/2012 | Katz et al. | |
| 2012/0169887 A1* | 7/2012 | Zhu | G06T 7/0046 |
| | | | 348/207.1 |
| 2012/0269384 A1* | 10/2012 | Jones et al. | 382/103 |
| 2013/0128034 A1 | 5/2013 | Carr | |
| 2013/0156299 A1 | 6/2013 | Zhang et al. | |
| 2013/0169822 A1 | 7/2013 | Zhu et al. | |
| 2013/0170696 A1 | 7/2013 | Zhu et al. | |
| 2013/0182114 A1* | 7/2013 | Zhang et al. | 348/150 |
| 2013/0182904 A1* | 7/2013 | Zhang | H04N 7/18 |
| | | | 382/103 |
| 2013/0182905 A1* | 7/2013 | Myers | H04N 7/18 |
| | | | 382/103 |
| 2013/0184592 A1* | 7/2013 | Venetianer et al. | 600/476 |
| 2013/0201330 A1* | 8/2013 | Thornton | H04N 7/18 |
| | | | 348/143 |
| 2013/0205314 A1* | 8/2013 | Ramaswamy et al. | 725/14 |
| 2013/0243240 A1* | 9/2013 | Marks | F24F 11/0034 |
| | | | 382/103 |
| 2013/0287257 A1* | 10/2013 | Dedhia et al. | 382/103 |
| 2013/0324876 A1* | 12/2013 | Bernal | A61B 5/091 |
| | | | 600/538 |
| 2014/0015930 A1* | 1/2014 | Sengupta | G06K 9/00771 |
| | | | 348/46 |
| 2014/0055610 A1* | 2/2014 | Ko et al. | 348/143 |
| 2014/0071242 A1* | 3/2014 | Lin et al. | 348/46 |
| 2014/0072170 A1* | 3/2014 | Zhang | G06K 9/00369 |
| | | | 382/103 |
| 2014/0079282 A1* | 3/2014 | Marcheselli | G06K 9/00335 |
| | | | 382/103 |
| 2014/0139660 A1* | 5/2014 | Zhu et al. | 348/143 |
| 2014/0169663 A1 | 6/2014 | Han et al. | |
| 2014/0198947 A1 | 7/2014 | Xu et al. | |
| 2014/0270358 A1 | 9/2014 | Zhu et al. | |
| 2014/0270483 A1 | 9/2014 | Lucey et al. | |
| 2014/0285717 A1 | 9/2014 | Cai | |
| 2014/0333775 A1 | 11/2014 | Naikal et al. | |
| 2015/0049906 A1* | 2/2015 | Fu | G06K 9/00362 |
| | | | 382/103 |
| 2015/0154453 A1* | 6/2015 | Wilf | 382/103 |
| 2015/0227784 A1 | 8/2015 | Roy et al. | |
| 2015/0227795 A1 | 8/2015 | Starner et al. | |

FOREIGN PATENT DOCUMENTS

| | | |
|---|---|---|
| WO | WO 2014/081687 A1 | 5/2014 |
| WO | WO 2014/081688 A1 | 5/2014 |
| WO | WO 2014/151303 A1 | 9/2014 |

OTHER PUBLICATIONS

"Cisco Video Surveillance 2900 Series Standard Definition IP PTZ Cameras" Product Specifications, Author Unknown, Apr. 2011.

International Preliminary Report on Patentability for International Application No. PCT/US2013/070688, entitled "Method and System for Counting People Using Depth Sensor," Date of issuance: May 26, 2015.

Janoch, A., et al., "The Berkeley 3D Object Dataset (Technical Report No. UCB/EECS-2012-85)," University of California at Berkeley, Electrical Engineering and Computer Sciences (2012).

Anonymous, "Spectra® HD Series IP Dome System High Definition Pan/Tilt/Zoom High-Speed Dome," Pelco, Inc., Clovis, CA (2012).

Tang, S., et al., "Histogram of Oriented Normal Vectors for Object Recognition with a Depth Sensor," The 11$^{th}$ Asian Conference on Computer Vision, Daejeon, Korea (2012).

Teichman, A. and Thrun, S., "Tracking-based semi-supervised learning," The Internatioanl Journal of Robotics Research 31(7):804-818, Stanford University. (2012).

Celik, H., "Dominant Object Detection for Autonomous Vision-Based Surveillance", *Ph.D. Thesis*, pp. 1-165 (Feb. 15, 2010).

Fardi, B., et al., "Obstacle Detection and Pedestrian Recognition Using a 3D PMD Camera", *Intelligent Vehicles Symposium 2006 IEEE*, pp. 225-230 (Jun. 13, 2006).

(56) References Cited

OTHER PUBLICATIONS

Fernandez-Carbajales, V., et al., "Robust People Detection by Fusion of Evidence from Multiple Methods", *Ninth Int'l Workshop on Image Analysis for Multimedia Interactive Services, IEEE Computer Society*, pp. 55-58 (May 7, 2008).

Garcia, A., et al., "Event detection for the TRECVID 2009 video surveillance dataset: the VPULab-UAM contribution", *Video Processing and Understanding Lab, Universidad Autonoma De Madrid, Technical Report SemanticVideo.TR.2009.02*, 13 pages (2009).

Haritaoglu, I., et al., "W[4]: Real-Time Surveillance of People and Their Activities", *IEEE Transactions on Pattern Analysis and Machine Intelligence*, vol. 22, No. 8, pp. 809-830 (Aug. 2000).

Li, M., et al., "Rapid and Robust Human Detection and Tracking Based on Omega-Shape Features", *2009 16th IEEE Int'l Conference on Image Processing*, pp. 2545-2548 (Nov. 7, 2009).

Notification of Transmittal of the International Search Report and the Written Opinion of the International Searching Authority, or the Declaration, PCT/US2013/070691, "Method and Apparatus for Detecting People by a Surveillance System", dated May 12, 2014.

Notification of Transmittal of the International Search Report and the Written Opinion of the International Searching Authority, or the Declaration, PCT/US2014/025408, "Online Learning System for People Detection and Counting", dated Jul. 10, 2014.

Zeng et al., "Robust Head-Shoulder detection by PCA-Based Multilevel HOG-LBP Detector for People Counting," IEEE International Conference on Pattern Recognition, (2010).

Li et al., Estimating the Number of People in Crowded Scenes by MID Based Foreground Segmentation and Head-Shoulder Detection, ICPR, (2008).

Gaikwad et al., "New Improved Methodology for Pedestrian Detection in Advanced Driver Assistance System," IJCA, (2012).

Choi, W., et al., "Detecting and Tracking People using an RGB-D Camera via Multiple Detector Fusion", *2011 IEEE Int'l Conf. on Computer Vision Workshops*, pp. 1076-1083, (Nov. 6, 2011).

Choudri, S., et al., "Robust Background Model for Pixel Based People Counting using a Single Uncalibrated Camera", *2009 Twelfth IEEE Int'l Workshop on Performance Evaluation of Tracking and Surveillance (Pets-Winter)*, 8 pages, (Dec. 7, 2009).

Fu, H., et al., "Real-time Accurate Crowd Counting Based on RGB-D Information", *2012 19th IEEE Int'l Conf. on Image Processing*, pp. 2685-2688, (Sep. 30, 2012).

Notification of Transmittal of the International Search Report and the Written Opinion of the International Searching Authority, or the Declaration, PCT/US2013/070688, "Method and System for Counting People Using Depth Sensor", dated May 12, 2014.

Spinello, L., et al., "People Detection in RGB-D Data", *2011 IEEE/RSJ Int'l Conf. on Intelligent Robots and Systems (IROS)*, pp. 3838-3843, (Sep. 25, 2011).

B. Dan, et al.; Robust People Counting System Based on Sensor Fusion, IEEE Transactions on Consumer Electronics, vol. 58, Issue 3, pp. 1013-1021, Sep. 2012.

T. Yahiaoui, et al.; Real-time passenger counting in buses using dense stereovision; J. of Electronic Imaging, vol. 19, Issue 3, pp. 2-10; Sep. 2010.

Chinese Office Action for Application No. 201380070934.6 dated Jan. 2, 2018.

* cited by examiner

METHOD AND SYSTEM FOR COUNTING PEOPLE USING DEPTH SENSOR

BACKGROUND

Many applications benefit from an accurate count of people within a scene. Some of these applications may be used in combination with Heat Ventilation and Air Conditioning (HVAC) control systems, video surveillance systems, retail systems, and other fields. For example, an accurate count of people may provide statistics information for retailers to diagnose their advertisement effort, others may detect tailgating at a security check point. Municipalities may also use an accurate scene population count to determine the number of visitors at specific facilities. Counting people through use of visible spectrum and thermal cameras can result in inaccurate counts.

SUMMARY

Visible spectrum cameras have difficulty detecting objects in a scene when shadows present similar shapes and sizes. Thermal cameras rely on temperature change to determine or detect motion in a scene. Thermal cameras encounter issues in detecting moving objects when temperatures are the same as, or near to, the temperature of the moving objects. An application for a depth sensor to count people accurately is described. Depth information may be used to derive a head size and with this information, determine properties of a detection window for a head. Other object detection methods apply multiple scales detector. By removing the multiple scale detections through relative object size calculation, the described technique improves the detection rate significantly, providing increased accuracy with reduced computational complexity through single-scale detection.

The embodiments described herein include a process for counting people that obtains depth data from a depth sensor, discerns foreground objects from background objects from within the depth data, and determines a foreground object from among the foreground objects that matches a reference model of a target object based on the depth data.

In one embodiment, the depth sensor may be mounted to provide a top view of a scene. The depth sensor may be used in combination with a visible spectrum camera to further determine a scene population count from the discerned foreground objects. According to one embodiment, a sensor (depth or visible spectrum) may track, from frame to frame, one or more foreground objects determined to match the reference model from among the foreground objects. Embodiments may also include resetting the scene population count to zero in an event of no motion within a scene for a predetermined temporal period. The process of counting people may also include obtaining visible images from a visible spectrum camera and using information in the visible spectrum camera to check accuracy of the count.

Information from the visible spectrum camera may include motion information, a time attribute, and location features. In one embodiment, sensors may communicate metadata to a data center. The process may further include imaging the scene using the depth sensor and reporting the number of people, statistics or complementary data. In one embodiment, the determination of a foreground object from among the foreground objects matches a reference model of a human head.

Embodiments may incorporate or use a computer readable medium having program instructions stored thereon, the program instructions being loadable and executable by a processor, and when executed by the processor, cause the processor to obtain depth data from a depth sensor, identify a foreground object from the depth data, and apply a machine learning application to generate a classification determination of the foreground object, and maintain a classification determination count. The program instructions may further cause the processor to subtract background information from the depth data to identify the foreground object, obtain image data from a visible spectrum camera, analyze the image data to produce image analytics, and combine information from the produced image analytics with depth data information to increase the accuracy in which the foreground object is identified. In one embodiment, the implementation of a machine learning application may include a neural network, a support vector machine and/or a clustering technique. Program instructions may train the machine learning application with a training data set and choose one or more features to create a selective feature vector in the optimization of the machine learning application.

A system for counting people may include a depth sensor receiving depth data, a memory, in communication with the depth sensor, storing the depth data. The system may further include a processor, in communication with the memory, executing program instructions. The program instructions may be configured to subtract background information from the depth data to discern a foreground object, apply a machine learning application to generate a classification determination of the foreground object, and maintain a classification determination count. The processor may be further configured to receive video data from a camera and use the video data from the camera to increase the accuracy of the machine learning application in generating the classification determination.

While those of ordinary skill in the art will appreciate a number of filters, one embodiment may apply a Gaussian filter to background information from the depth data. The system may also create a depth feature set identifying selective features to analyze the depth data from the depth sensor and create a video feature set identifying selective features to analyze the video data from the camera. In one embodiment, the processor may be configured to apply the feature sets to the depth data to determine a depth classification and a video classification. In addition, the system may calculate the classification determination of the foreground object with information from the depth classification and the video classification and update the classification determination count.

BRIEF DESCRIPTION OF THE DRAWINGS

The foregoing will be apparent from the following more particular description of the embodiments, as illustrated in the accompanying drawings in which like reference characters refer to the same parts throughout the different views. The drawings are not necessarily to scale, emphasis instead being placed upon illustrated embodiments.

DETAILED DESCRIPTION

A description of embodiments follows.

Figure 1:
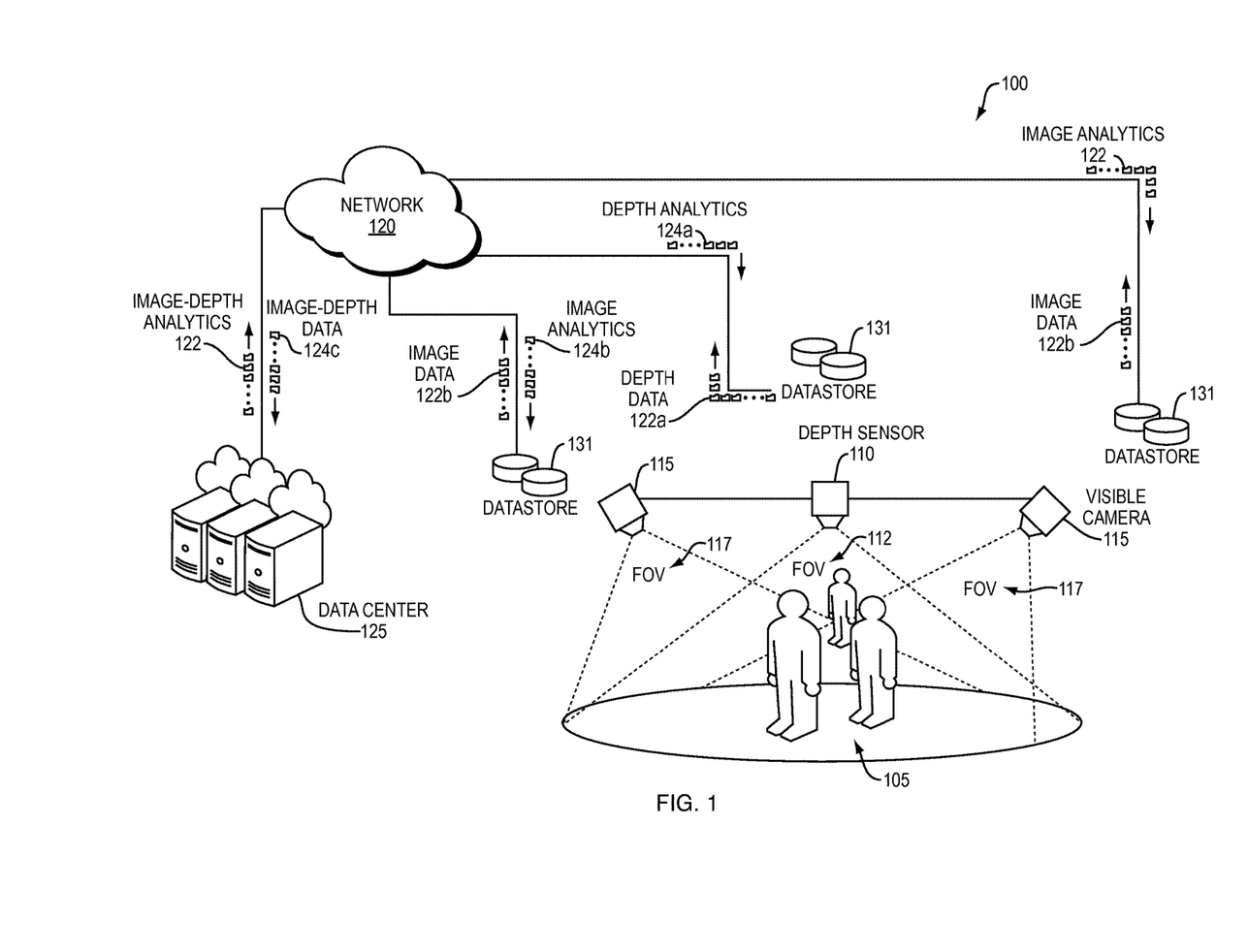
FIG. 1 is a schematic diagram that illustrates a depth sensor-based system for counting people.

FIG. 1 illustrates a schematic diagram of one embodiment of a system for counting based on a depth sensor 110. As illustrated in FIG. 1, a system 100 of counting based on the depth sensor 110 is provided. The system 100 includes a scene 105, the scene being a range of vision detectable by a sensor/camera. As illustrated in the scene, one or more persons may be located within one or more fields of view 112, 117, of cameras or imaging devices such as the depth sensor 110 and visible spectrum camera(s) 115. The visible spectrum cameras 115 and the depth sensor 110 may include an associated field of view 117, 112, respectively. The depth sensor 110 and/or cameras may be associated with a data store 131, which may be local, such as accessible on a common network or via a wide area network 120.

A depth sensor 110 acquires depth data from one or more scenes. The depth data may be processed to remove background information and provide a focus on objects that exhibit motion within a scene. In one embodiment, objects detected as exhibiting motion within a scene are transferred to one or more components for analysis. The result of the analysis may include a classification of the detected objects into a category, e.g., person or non-person. Analyses based on depth data are generally less susceptible to errors associated false positives due to temperature change as shown with thermal data or to errors associated with false positives due to shadows as shown with visible spectrum images. Therefore, depth data can return a more accurate classification where susceptibility to errors associated with the noted false positives is a concern. Furthermore, depth data detection may reduce the computational complexity by providing a filtered data set and selective features of a target object to a classifier for counting people.

Continuing to refer to FIG. 1, the data store 131 may be any suitable type of data storage device including, for example, a memory chip, hard drive, USB flash drive, remote accessible database, cache memory, and/or the like. The data store may be in communication with or place the depth sensor 110 or cameras 115 in communication with the communications network 120 and may include wired and wireless networks.

A communications network may be any one or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), and I-mode; and/or the like. A network interface may be regarded as a specialized form of an input/output interface. Further, multiple network interfaces may be used to engage with various communications network types. For example, multiple network interfaces may be employed to allow for communication over broadcast, multicast, and/or unicast networks.

Also illustrated in FIG. 1 is a data center 125 in operable communication with the network. The data center may receive data from the depth sensor and/or the visible camera. In one embodiment, the visible camera may transmit image data in one or more predetermined formats to the data center 125 via the network 120. Similarly, the depth sensor may send depth data to the data center 125 for processing and/or analysis. In one embodiment, the data center 125 may include one or more computer systems (clients/servers) (not shown) distributed over a network. These computer systems may be responsible for receiving, processing, analyzing, transmitting, and/or storing: image data, video data, depth data, and/or the like. In one embodiment, the data center 125 may include, store, instantiate, run and/or access (e.g., through an Application Programming Interface (API)), a detection engine, described in further detail below.

Figure 2:
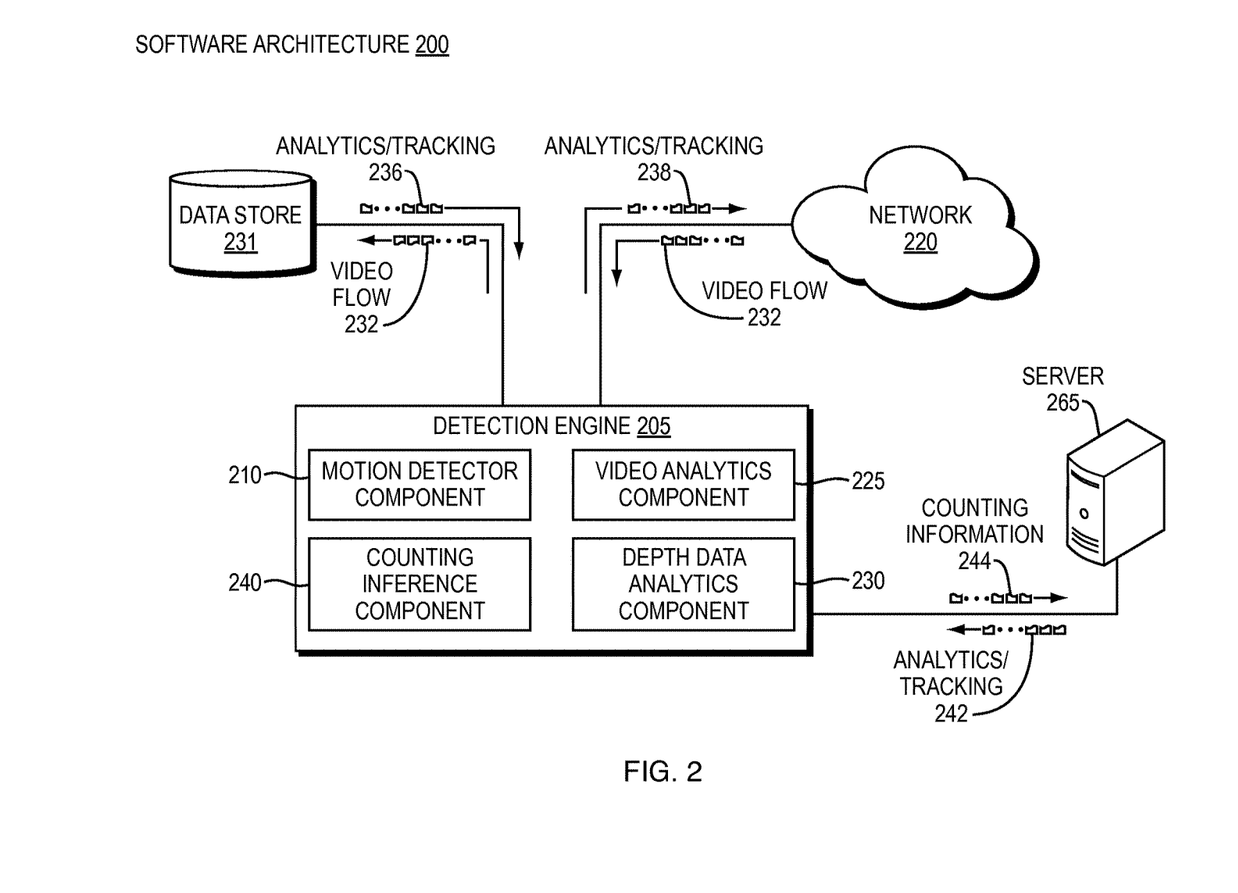
FIG. 2 is a block diagram that illustrates one embodiment of a software architecture for counting based on a depth sensor according to one embodiment.

FIG. 2 is a block diagram that illustrates a software architecture according to one embodiment. As illustrated in FIG. 2, a detection engine 205 may include a motion detector component 210, video analytics component 225, depth data analytics component 230 and counting inference component 240. The detection engine 205 is in operable communication with a network 220, data store 231, and/or a server 265. Without limitation, the detection engine may include additional components, e.g., an API, storage component, cloud service component, or the like.

The motion detector component 210 may include one or more methods of object motion detection using data received from one or more sensor devices. In one embodiment, the motion detector component detects objects from depth data received from the data center. In addition, the motion detector component may include a script or program to detect objects from image data received from a visible spectrum camera. Those of ordinary skill in the art will recognize other types of data may also be received from the motion detector component and are considered to fall within the scope of the embodiments described. One type of detection performed by detection engine is the detection of motion.

Motion detection may identify where people appear in the scene. A background model can be established to detect motion with a background subtraction process such as Gaussian model, Gaussian mixture model and/or a non-parametric background model. The depth data can be calibrated to measure an object's three-dimensional (3-D) information, such as topological features from a given location on the object (e.g., a seat of a chair compared to a top of a backrest of the set or legs of a person relative to the top of the person's head) with respect to distance from a depth sensor. A counting method may be based on depth segmentation and head detection. In one embodiment, depth segmentation can initially decide if there are people in the scene. For example, if a foreground object size is larger than one person, a head detection process may be applied to measure the number of heads in the scene.

As illustrated, the contiguous frames of the video flow 232 may be transmitted to the data store 231 or from a node (not shown) on the network 220. The data store 231 may process the video flow 232 and return analytics/tracking information 236 to the detection engine 205. In one embodiment, the motion detector component 210 may be combined, consolidated, and/or distributed in any number of ways to facilitate development and/or deployment. For example, the motion detector component 210 may be stored, in whole or in part, in the data store 231 or server 265. To accomplish this, a motion detector code base may be statically integrated or dynamically loaded (on demand) to the data store 231 or server 265.

In one embodiment, the detection engine 205 may receive video flow data 232 from a node on the network 220 and provide analytics/tracking information 238 from one or more components associated with the detection engine. The detection engine 205 may also transmit depth/image data 244 to a server 265. The server may reside at the data center described herein. The server may store and execute one or more components associated with the detection engine 205. In one embodiment, the server may transmit analytics/tracking information 242 based on the received depth/image data to the detection engine 205.

To supplement the detection process, one or more tripwire(s) with optional direction may be setup in the field of view to measure the number of people entering and exiting the area. In one embodiment, a detected object may cross the tripwire, and the metadata about this event (e.g., tripwire count, time, location, etc.) may be sent to the data center.

As noted above, the detection engine may conduct a head detection process based on depth data. Depth data may be stored in a two dimensional array. The depth data can be calibrated to measure the physical positions of the objects in the real world. After calibration, the depth data may give the distance between the depth sensor and the objects. From this data, the size of head to be detected may determined.

To accomplish determining the size of a head, one formula may represent the distance from the camera to the head center as X and the image width as M pixels. The angle that the depth sensor covers may be represented by $\alpha$. The physical range that the sensor can cover at the distance of X meters can be calculated as:

$$w = 2 * X \tan\left(\frac{\alpha}{2}\right)$$

From this range, the head size in pixels may be derived based on distance. Suppose the average head radius is r meters, then it can be represented in pixels as:

$$R = \frac{rM}{2 * X \tan\left(\frac{\alpha}{2}\right)}$$

In one embodiment, the detection process may check a sliding window of a given size with a non-max suppression process to detect heads. The non-max suppression is applied to avoid multiple heads overlapped together.

A machine learning component may include one or more machine learning applications to detect objects based on data received from one or more sensor devices. In one embodiment, the machine learning component includes behavioral detection methods for detecting objects from training data. In one embodiment, a learning application can be random forest, adaboost, neural network, support vector machine, or the like. Random forests are a combination of tree predictors such that each tree depends on the values of a random vector sampled independently and with the same distribution for all trees in the forest. The generalization error for forests converges to a limit as the number of trees in the forest becomes large. The generalization error of a forest of tree classifiers depends on the strength of the individual trees in the forest and the correlation between them.

The AdaBoost method takes as input a training set (x1; y1) . . . (xm; ym) where each $x_i$ belongs to some domain or instance space X, and each label $y_i$ is in some label set Y. AdaBoost calls a given weak or base learning function repeatedly in a series of rounds t=1 . . . T. The AdaBoost method maintains a distribution or set of weights over the training set. The weight of this distribution on training example i on round t may be denoted as $D_t(i)$. Initially, weights are set equally, but on each round, the weights of incorrectly classified examples are increased so that the weak learner is forced to focus on the hard examples in the training set. The weak learner's job is to find a weak hypothesis appropriate for the distribution $D_t$. The goodness of a weak hypothesis is measured by its error. In one embodiment, the error may be measured with respect to the distribution $D_t$ on which the weak learner was trained. The weak learner may use the weights $D_t$ on the training examples. In one embodiment, a subset of the training examples can be sampled according to $D_t$, and these (unweighted) resampled examples can be used to train the weak learner.

Neural networks include simple processing elements (neurons), a high degree of interconnection, simple scalar messages and adaptive interaction between the processing elements. In one embodiment, the neural network may be configured for a specific application, e.g., pattern recognition or data classification. The neural network provides a machine with the ability to learn adaptively based on data given for training, organize and represent data from examples, operate in real time, and include fault tolerance through redundant information coding. A support vector machine (SVM) is one example of a machine learning application for data classification. An SVM classifier generally maps data into a high dimensional space and finds a separating hyperplane with a maximal margin. In one embodiment, the machine learning component receives representations of detected objects in depth data or image data and maps the representations onto the hyperplane as a person or non-person.

One or more machine learning applications may be used in combination with one or more clustering techniques. A clustering technique generally involves associating a set of objects into one or more groups (clusters). In one embodiment, data received from the detection engine may be clustered to assist with the determination of whether an object being tracked or to be tracked should be classified as a person or non-person. For example, candidate data objects may be coded for head detection processing by the motion detector component 210. The motion detector component 210 may send the candidate data object or target object to the machine learning component, e.g., an SVM classifier, for classification. The machine learning component may return a classification for the target object that triggers additional functions in the detection engine, e.g., the counting inference component to update the scene population count.

In order to calculate features fast, one embodiment may use an integral image of quantized gradient orientations to accelerate the calculation. In one embodiment, the proposed incremental learning procedure includes: manually labeling head(s) from training depth images; applying Histogram Oriented Depth Gradient (HODG) to extract head features as positive features and extract features of other locations as negative features. An iterative loop may initially set an iterative variable to zero, e.g., set i=0. The iterative process may include applying machine learning applications (e.g., Back Propagation (BP) neural network) to learn the classifier with the given training data set i. In one embodiment, the process may include testing the learned model with labeled test image set i. The learning process may include adding false classified features (false positives) into the training data set. The iterative variable may be incremented, e.g., set i=i+1, and the procedure may repeat some of the processes until the learned model is stable and the classification error is lower than a threshold.

The depth data analytics component 230 may combine effective calibrated head features, fast feature extraction, and efficient classification method to achieve real-time head detection. One particular advantage of the proposed calibrated feature is that the rough head size is known and it is not necessary to detect in multi-scale like other methods such as Histogram Oriented Gradient (HOG) object detection. Although multi-scale approaches may be implemented, the computational complexity of the detection process may be reduced with a single scale approach for head detection.

The depth data analytics component 230 may generate a histogram from the received image data and depth data. In one embodiment, a histogram oriented gradient (HOG) may be generated from the received data. In addition, a histogram oriented depth gradient (HODG) may also be generated. In one embodiment, head detection may be based on the generated HODG. The HODG technique counts occurrences of gradient orientation in a selected window. In one embodiment, the gradient has a sign to indicate the real direction of the gradient and/or the magnitude of the gradient. With the signed gradient, it may be deduced if the gradient is up or down. The window may be divided into cells at first, e.g., 3×3, 4×4 and/or the like. In one embodiment, the gradient orientations may be calculated within the cells. In one embodiment, a monolithic function of depth gradient is applied as the weight. A histogram of weighted gradient orientations may be used to represent the cell. The histogram of the weighted depth gradient orientations may be combined together to form the feature vector for head detection.

The depth data analytics component 230 may select and analyze features from image data and/or depth data. In one embodiment, a set of features is selected for analyzing image data. For example, when depth/image data is received, it may be featurized to identify and/or extract features associated with depth data and/or image data. The featurizing of frames from image and/or depth data may depend on a type of classification. For example, classifications of non-human objects may identify and extract a different set of features from the frames of depth and/or image data. When the appropriate features are identified or extracted, they may be compared to a training data set that is pre-labeled with positive classifications and false positives. The comparison of features from image and/or depth data may allow the depth data analytics component to determine whether features extracted match features from the trained data set. In an embodiment where people are being counted, the comparison may result in the generation of a people-type score to assist with the classification determination.

The depth data analytics component 230 may assist with head tracking if more than one person is entering a detection zone. In one embodiment, the detection engine sends head tracking data to the counting inference component 240 to inform a counting agent. A counting method may include learning the background model of the scene; using background subtraction to detect foreground pixels that are closer to the depth sensor with a predefined threshold; using connected component analysis to label foreground pixels into disconnected objects; or calculating the size of the objects.

If the size of an object is larger than one person size, the system may apply head detection to check if more than one heads can be found. In one embodiment, detected head(s) may be tracked as individual objects. In addition, tripwires may be applied to detect if any object crosses them. The cross detection may be recorded for In/Out counting. For example, the difference between the summation of "In" count and the summation of "Out" count is the number of people within a given area (i.e., volume of interest). An additional motion/visual sensor can be mounted in rooms for further motion detection accuracy and for the prevention of miscounting. If an in-room sensor does not detect any motion within a predetermined time, a current count for the room may be reset to zero (either automatically or manually, through human input).

The video analytics component 225 may include one or more components dedicated to receiving, processing and analyzing data received from a camera. According to one embodiment, the video analytics 225 may be used in combination with the depth data analytics component to increase the accuracy of the detection engine. Depending on the type of detection, the depth data analytics component 230 may be used in combination with the video analytics component 225 to increase accuracy of camera-based detections.

The depth data analytics component 230 includes one or more components for detecting objects in a scene based on the depth data received from the data center and/or depth sensor. Depth sensor does not "see" shadow and reflection, which can affect object segmentation in visible camera systems. Depth sensors may supplement thermal data from a thermal camera since there is no temperature change affecting motion detection of the depth sensor. The detection engine 205 may distribute tasks to the depth data analytics component and other components to assist with counting people. The component collection may execute program instructions associated with a head detection based on depth information.

In one embodiment, the depth data analytics component may work with other components, e.g., the motion detector component, to execute program instructions to perform head detection based on depth information. The head detection performed may transmit data to the counting inference component to assist with maintaining a scene population count. In one embodiment, the depth data can be calibrated to measure the physical positions of the objects in the real world. After calibration, the depth data may provide the distance between the depth sensor and the objects. The head detection process may combine effective calibrated head features, fast feature extraction, efficient classification method to achieve real-time head detection. One aspect of the proposed calibrated feature(s) is that an estimated head size for a scene or field of view may be pre-determined. The depth data analytics component may use a sliding scale approach to determine if detected objects match a given reference model. For example, a sliding scale approach may determine if an object or object feature detected is within the confines of the sliding scale.

The counting inference component 240 may maintain a count of detected objects in a scene. In one embodiment, the server 265 receives counting information 244 from the detection engine 205. The server 265 may then derive a set of final counting numbers, e.g., number of people in a field of view at a given time, number of people in a field over a period of time, etc. In one embodiments with more than one locations are being monitored by the detection engine, e.g., a building having multiple entrance foyers, floors, stairwells, etc., the server may derive a consolidated count for the building or a subset of locations associated with the building. For example, as objects enter and leave a scene, the counting inference component may maintain a scene population count. To address individuals appearing in a scene at a similar time and in physical close proximity, the counting inference component 240 may receive additional data from a tripwire or an infrared motion detector for detecting motion. The counting inference component may correlate scene population count data with activity data that is received or based on information from a location depth sensor, visible spectrum camera, and/or tripwire.

In one embodiment, the data center may store one or more components associated with the detection engine, receive and store image and/or depth data, as well as, distribute processing tasks associated with the detection engine. In one embodiment, the data center receives image and/or depth data from one or more data stores. The data center may include a detection engine server responsible for identifying and extracting features from the data received. Other distributed components may also be in communication with the detection engine to assist with determining whether features received from the sensor(s) and/or camera(s) fall into one or more classes upon classification.

Figure 3:
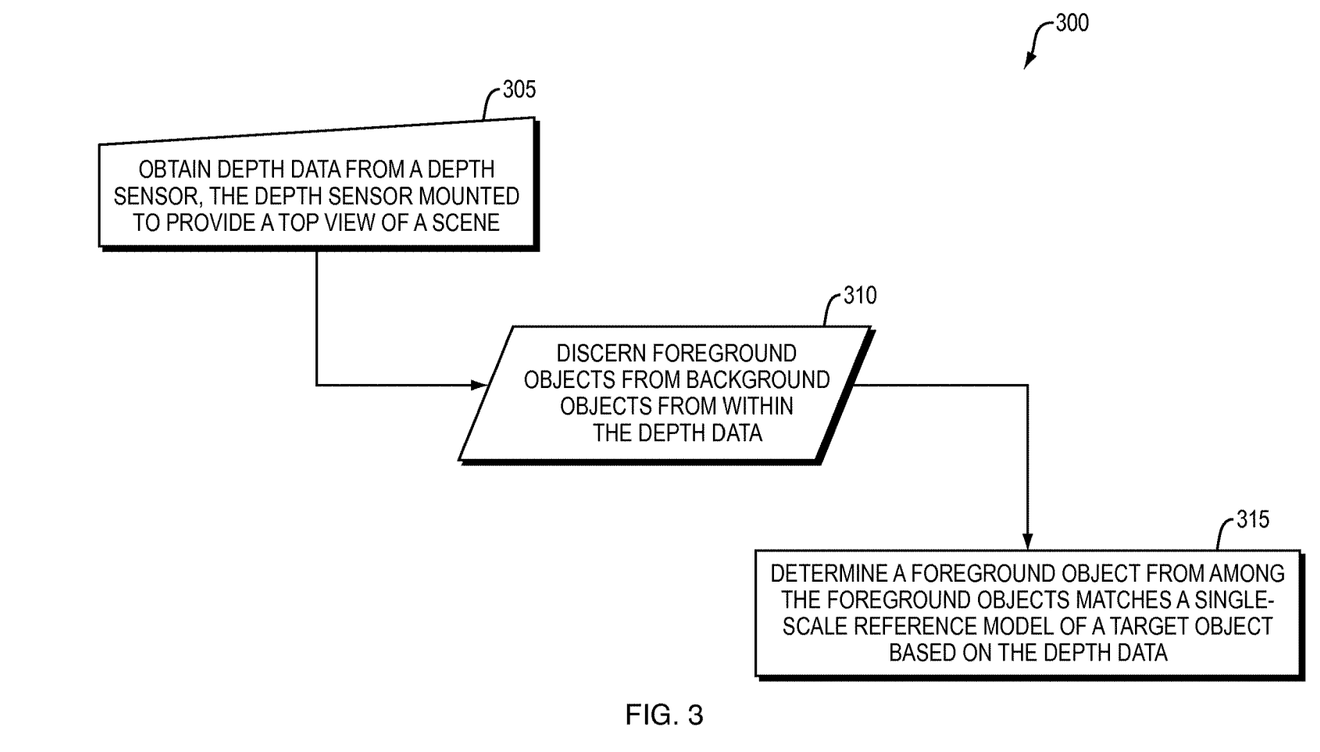
FIG. 3 is a flow diagram that illustrates a process for counting based on a depth sensor according to one embodiment.

FIG. 3 illustrates a flow diagram for a process of counting people based on a sensor according to one embodiment. As illustrated in FIG. 3, the process 300 includes obtaining depth data from a depth sensor mounted to provide a top view of a scene. A top view of the scene may be a directly vertical (90°) view from above. The top view may also be a view substantially 90° from the top, give or take 30°. The process may also discern foreground objects 315 from background objects 310 within depth data. One or more background subtraction techniques may be used to discern foreground objects from background objects. In one embodiment, the process may determine a given foreground object 315, from among the foreground objects, matches a head reference model based on the depth sensor data.

Figure 4:
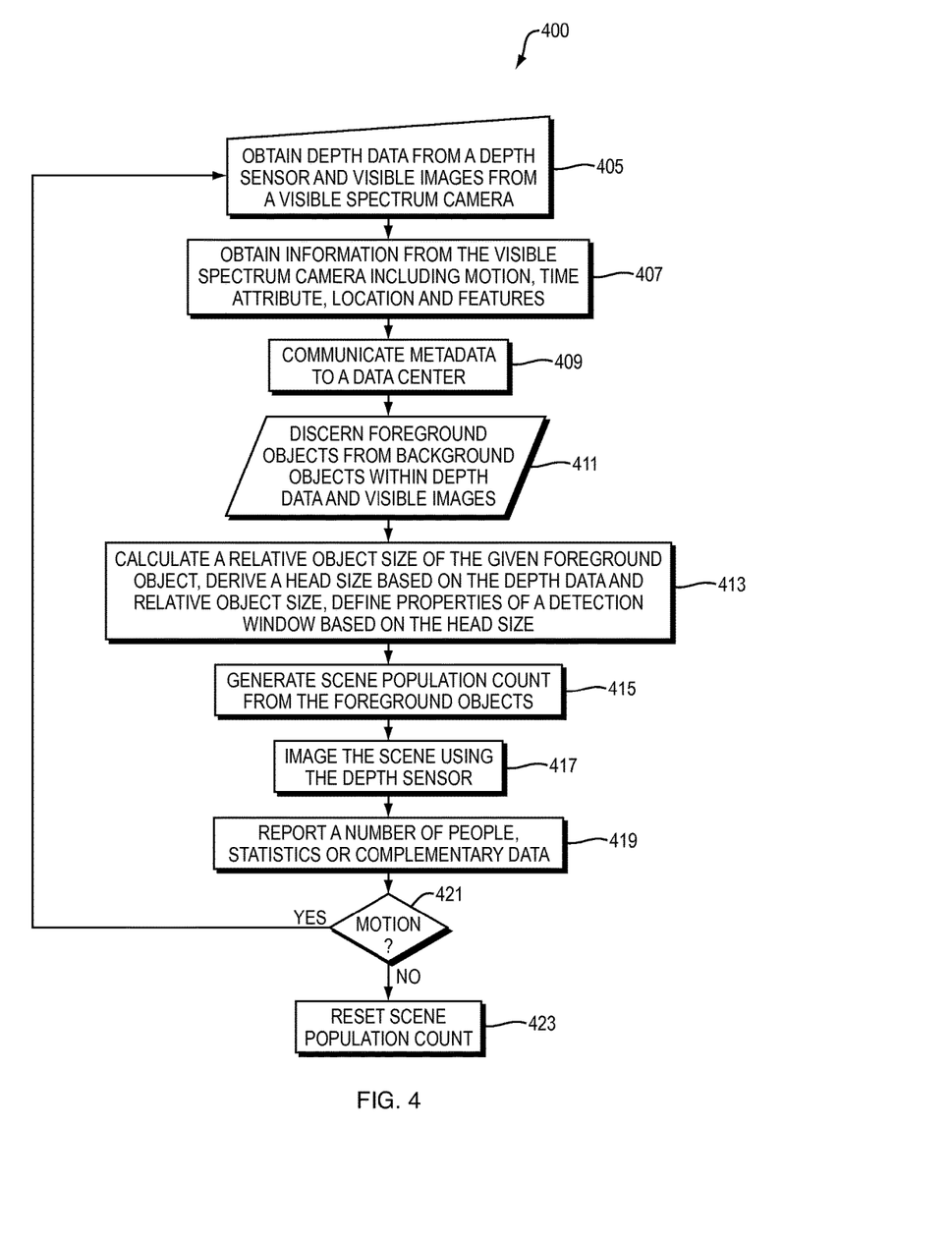
FIG. 4 is a flow diagram that illustrates a process for counting based on a depth sensor and a visible spectrum camera according to one embodiment.

FIG. 4 is a flow diagram that illustrates a process 400 for counting based on a depth sensor and a visible spectrum camera according to one embodiment. The process for counting may obtain depth data from a depth sensor and visible images from a visible spectrum camera 405. In one embodiment, the process may obtain information from the visible spectrum camera including motion information, a time attribute, and location features 409. The process for counting people may include communicating metadata to a data center 409. For example, metadata may include information about the location of the camera, a timestamp, an associated physical address, e.g., building name. The process may discern foreground objects from background objects from within the depth data and visible images 411. In one embodiment, counting people may determine a foreground, from among the foreground objects, matches a reference model of a target object based on the depth data, wherein the target object is a human head 413. The process of counting people may determine a scene population count from the foreground objects 415. In one embodiment, the process may include imaging the scene using the depth sensor 417 and reporting a number of people, statistics or complementary data 419.

For example, statistics may include information regarding the frequency of objects appearing in a scene or the average time objects appear in a scene. Complementary data may include information about non-detected objects in a scene. For example, information about non-detected objects in a scene may include information describing products offered by a retailer located in the scene. The complementary data may include a determination of whether a given product in a specific location attracts attention from a person. The determination of whether the given product attracts attention may include a behavioral detection, e.g., a person stops for a pre-determined temporal period to inspect the non-detected object.

The process 400 for counting may check for motion. For example, an additional motion/visual sensor can be mounted in rooms for further motion detection accuracy and for the prevention of miscounting. If an in-room sensor does not detect any motion within a predetermined time, a current count for the room may be reset to zero 423 (either automatically or manually, through human input). If motion is detected, the process 400 may continue to obtain depth data and visible images.

Figure 5:
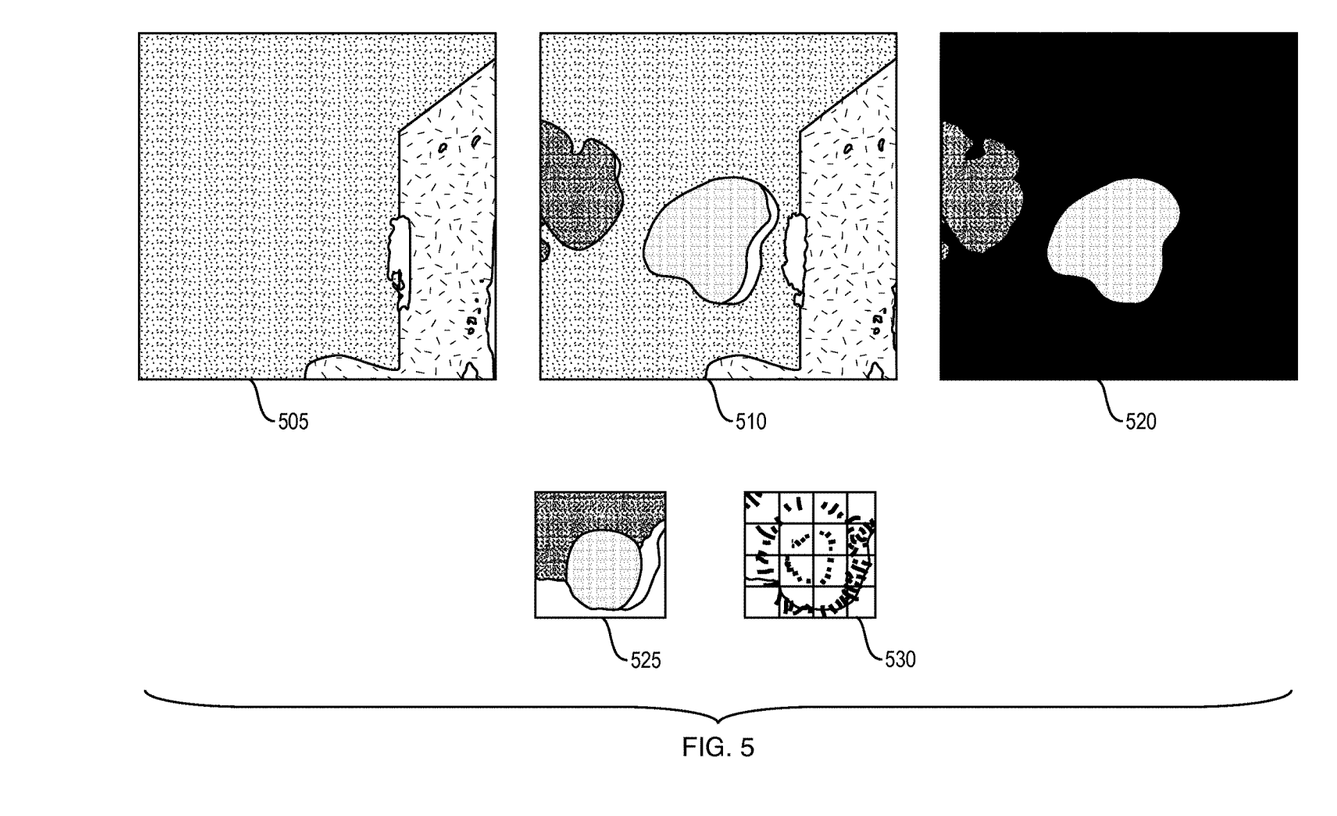
FIG. 5 is a set of sample frames representing depth data received from a depth sensor according to one embodiment.

FIG. 5 includes sample frames of depth data. As illustrated in FIG. 5, a first frame 505 illustrates a background model according to one embodiment. The sample frame 505 illustrates some white pixels where depth information may not be available and may be subtracted by the detection engine.

Also illustrated in FIG. 5, is a sample input frame 510. Input frame 510 is one example of how moving objects may be represented by depth data. The center of the frame 510 illustrates what may or may not be a person, e.g., the human eye may infer the object in the center of the image has an appearance similar to two shoulders and the top of a human head. The depth data in frame 510 has not yet undergone background subtraction process, where the non-moving objects in the frame are at least partially removed from the frame. Frame 520 illustrates the moving objects detected after background subtraction. As illustrated in FIG. 5, the moving objects detected in frame 520 have a sharper contrast to the background when compared to the objects in frames 505 and 510. As illustrated in the sample frame 520, the object to the left of the potential target in the center of image can be inferred by the human eye to be an animal or pet.

In one embodiment, moving objects are detected from background subtraction as noted above. The variation in space of a quantity can be represented by a slope. The gradient represents the steepness and direction of that slope. In one embodiment, the Histogram of Oriented Depth Gradient (HODG) describes local object appearance and shape within a depth image through the distribution of depth gradient(s) directions. The implementation can be achieved by dividing the image into small connected regions, called cells, and for each cell, compiling a histogram of gradient directions for the pixels within the cell. The combination of these histograms then represents a descriptor. Gradient computation may apply a 1-D centered, point discrete derivative mask in both of the horizontal and vertical directions. Specifically, filtering the depth data of the image with the following filter kernels: $[-1,0,1]$ and $[-1,0,1]^T$.

A histogram component may create cell histograms. For example, each pixel within the cell may cast a weighted vote for an orientation-based histogram channel based on the values found in the gradient computation. The cells themselves may be rectangular or radial in shape, with the histogram channels evenly spread over 0 to 360 degrees. As for the vote weight, pixel contribution may include a gradient magnitude or a function of gradient magnitude.

Frame 525 and 530 are frames that illustrate a head window and its corresponding depth gradient magnitudes and orientations. Frame 525 is a sample frame illustrating a head window without corresponding depth gradients and magnitudes. Frame 530 is a head window divided into four-by-four cells. As illustrated in Frame 530 the depth gradient magnitudes and orientations on the perimeter cells are of a greater length than the depth gradient magnitudes and orientations located in the four internal cells. This difference may represent a larger distance from side of the head to the shoulder in the neighboring cell, when compared to the shorter magnitudes and orientations representing the difference in distance from the side of the head to the top of the head. In one embodiment, each cell may construct a histogram based on gradient magnitudes and orientations. The histograms may be combined to form a feature vector to describe a head window.

Figure 6:
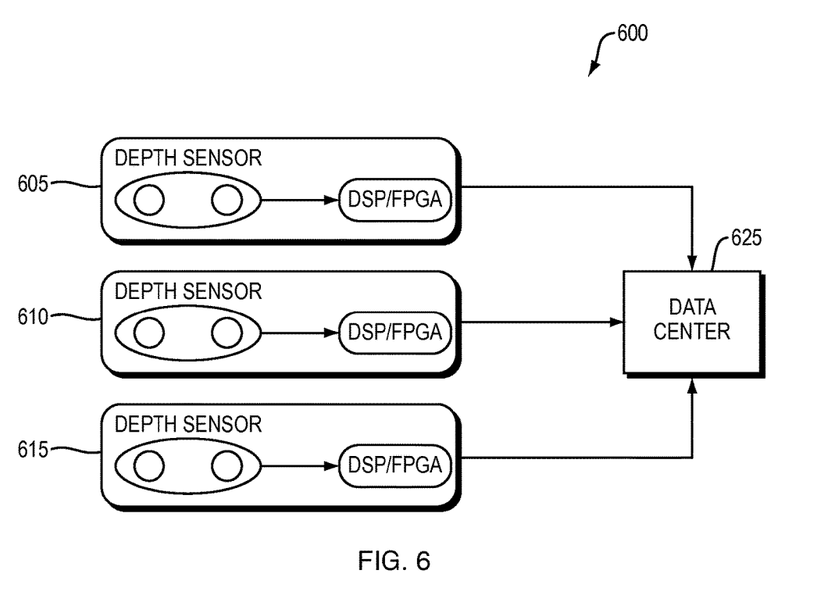
FIG. 6 is a block diagram that illustrates a depth sensor system according to one embodiment.

FIG. 6 is a block diagram that illustrates a depth sensor system 600 according to one embodiment. As illustrated in FIG. 6, the depth sensor system 600 includes a first sensor 605, a second sensor 610, a third sensor 615 and a data center. In one embodiment, a depth sensor can be downwardly mounted to detect motion and count the number of people entering and leaving an area. The depth sensor may include an infrared laser projector combined with a monochrome Complementary Metal Oxide Semiconductor (CMOS) sensor, which captures video data in 3D under ambient light conditions.

A sensor may include a digital signal processor (DSP) and/or Field Programmable Gate Array (FPGA). The DSP/FPGA is a computing unit configured to process depth data and may be embedded onboard with a depth sensor. Counting information processed by the DSP/FPGA may be sent to data center via network processing and data mining. Depending on the particular implementation, features of the depth sensor system may be achieved by implementing a microcontroller. Also, to implement certain features of the depth sensor system, some feature implementations may rely on embedded components, such as: Application-Specific Integrated Circuit (ASIC), DSP, FPGA, or the like embedded technology. For example, depth sensor system (distributed or otherwise) may be implemented via the microprocessor and/or via embedded components; e.g., via ASIC, coprocessor, DSP, FPGA, or the like. Alternately, some implementations of the depth sensor system may be implemented with embedded components that are configured and used to achieve a variety of features or signal processing.

In one embodiment, a plurality of depth sensors can be mounted at data collecting points such as doors accessing rooms where entering and exiting can be monitored. If there are multiple doors to access a room, a depth sensor may be mounted for each door. In one embodiment, metadata about the counting information may be sent to the data center for further processing. Metadata of video analytics may include descriptions of objects and events. Metadata may also information about events, such as, but not limited to, object merging, splitting, appearing, disappearing, etc.

Figure 7:
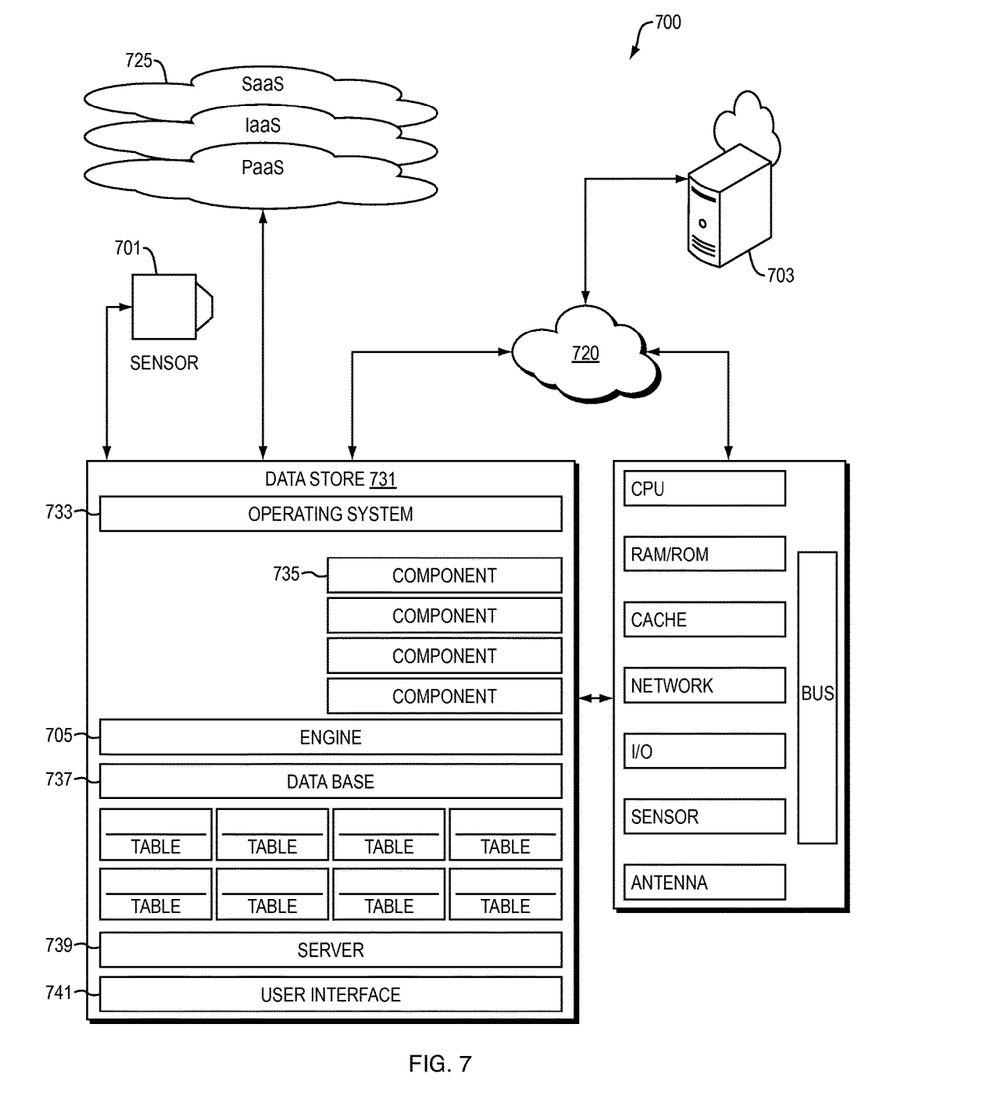
FIG. 7 is a schematic diagram of a depth sensor system according to one embodiment.

FIG. 7 is a block diagram illustrating embodiments of a People Counting (PC) Platform 700. In this embodiment, the PC Platform may serve to aggregate, process, store, search, serve, identify, instruct, generate, match, and/or facilitate interactions with a computer. Typically, users, which may be people and/or other systems, may engage information technology systems (e.g., computers) to facilitate information processing. In turn, computers employ processors to process information; such processors may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Information systems may be used to collect data for later retrieval, analysis, and manipulation, which may be facilitated through a database program 737.

In one embodiment, the PC Platform may be connected to and/or communicate with entities such as, but not limited to: one or more users from user input devices (e.g., Flash/SD/SSD); peripheral devices, e.g., a surveillance device or camera 701; an optional cryptographic processor device; and/or a communications network 720. Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers 739 serve their information to requesting "client(s)". The term "client" as used herein refers generally to a computer, program, other device, user and/or combination thereof that is capable of processing and making requests and obtaining and processing any responses from servers across a communications network.

The PC Platform may be based on one or more computer system(s) that may comprise a central processing unit ("CPU(s)" and/or "processor(s)" (these terms are used interchangeable throughout the disclosure unless noted to the contrary)), a memory (e.g., a read only memory (ROM), a random access memory (RAM), Cache etc.), and/or an Input/Output Ports, and may be interconnected and/or communicating through a system bus on one or more (mother) board(s) having conductive and/or otherwise transportive circuit pathways through which instructions (e.g., binary encoded signals) may travel to effectuate communications, operations, storage, etc.

The processor and/or transceivers may be connected as either internal and/or external peripheral devices (e.g., sensors) via the I/O ports. In turn, the transceivers may be connected to antenna(s), thereby effectuating wireless transmission and reception of various communication and/or sensor protocols. The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc.

The embedded components may include software solutions, hardware solutions, and/or some combination of both hardware/software solutions. Storage interfaces, e.g., data store 731, may accept, communicate, and/or connect to a number of storage devices such as, but not limited to: storage devices, removable disc devices, solid state drives (SSD) and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network card(s) may accept, communicate, and/or connect to a communications network 720. Through a communications network 720, the PC Platform is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A cloud service 725 may be in communication with the PC Platform. The cloud service may include a Platform-as-a-Service (PaaS) model layer, an Infrastructure-as-a-Service (IaaS) model layer and a Software-as-a-Service (SaaS) model layer. The SaaS model layer generally includes software managed and updated by a central location, deployed over the Internet and provided through an access portal. The PaaS model layer generally provides services to develop, test, deploy, host and maintain applications in an integrated development environment. The IaaS layer model generally includes virtualization, virtual machines, e.g., virtual servers, virtual desktops and/or the like.

Input Output interfaces (I/O) may accept, communicate, and/or connect to user input devices, peripheral devices, cryptographic processor devices, and/or the like. The video interface composites information generated by a computer system and generates video signals based on the composited information in a video memory frame. Another output device is a television set, which accepts signals from a video interface. Typically, the video interface provides the composited video information through a video connection interface that accepts a video display interface (e.g., a composite video connector accepting a composite video cable; a DVI connector accepting a DVI display cable, etc.).

Peripheral devices may be connected and/or communicate to I/O and/or other facilities of the like such as network interfaces, storage interfaces, directly to the interface bus, system bus, the CPU, and/or the like. Peripheral devices may be external, internal and/or part of PC Platform. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

Generally, any mechanization and/or embodiment allowing a processor to affect the storage and/or retrieval of information is regarded as memory. It is to be understood that the PC Platform and/or a computer systems may employ various forms of memory. In a typical configuration, memory will include ROM, RAM, and a storage device. A storage device may be any conventional computer system storage. Storage devices may include a (fixed and/or removable) magnetic disk drive; a magneto-optical drive; an optical drive; an array of devices (e.g., Redundant Array of Independent Disks (RAID)); solid state memory devices (USB memory, solid state drives (SSD), etc.); other processor-readable storage mediums; and/or other devices of the like. Thus, a computer system 703 generally requires and makes use of non-transitory and/or transitory memory.

A user interface component 741 is a stored program component that is executed by a CPU. The user interface may be a graphical user interface as provided by, with, and/or atop operating systems 733 and/or operating environments. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like.

A Web browser component (not shown) is a stored program component that is executed by a CPU. The Web browser may be a conventional hypertext viewing application. Secure Web browsing may be supplied with 128 bit (or greater) encryption by way of HTTPS, SSL, and/or the like. Web browsers and like information access tools may be integrated into mobile devices. A Web browser may communicate to and/or with other components in a component collection, including itself, and/or facilities of the like. The browser may communicate with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both.

The structure and/or operation of any of the PC Platform engine set 705 may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. The Engine Set 705 components may be consolidated and/or distributed in countless variations through standard data processing and/or development techniques. Multiple instances of any one of the program components in the program component collection 735 may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the PC Platform will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device 703. For example, a non-transient machine-readable medium may include read only memory (ROM); random access memory (RAM); magnetic disk storage media; optical storage media; flash memory devices; and others.

While this invention has been particularly shown and described with references to example embodiments thereof, it will be understood by those skilled in the art that various changes in form and details may be made therein without departing from the scope of the invention encompassed by the appended claims.

What is claimed is:

1. A method, comprising:
    obtaining a frame of depth data from a depth sensor, the depth sensor mounted to provide a top view of a scene;
    discerning foreground objects from background objects from within the frame of depth data;
    for a given foreground object, calculating expected relative head size, in pixels of the frame of depth data, of the given foreground object at a depth of the given foreground object, the expected relative head size calculated using a pre-determined head size, a width in pixel units of the frame of depth data, an angle the depth sensor covers, and a depth of the given foreground object determined using the frame of depth data obtained; and
    determining if the given foreground object matches a single-scale reference model of a target object, the single-scale reference model of the target object determined based upon the expected relative head size at the depth of the foreground object,
    wherein the expected relative head size is calculated according to the following equation:

$$R = \frac{rM}{2 * X \tan\left(\frac{\alpha}{2}\right)}$$

where
    R is the expected relative head size in pixels,
    r is an average head radius,
    α is the angle the depth sensor covers,
    X is a distance from the depth sensor to a head center, and
    M is an image width.

2. The method of claim 1, further comprising:
    defining properties of a detection window based on the expected relative head size; and
    generating a scene population count based on an application of the detection window to the given foreground object.

3. The method of claim 2, further comprising resetting the scene population count to zero in an event of no motion within a scene for a predetermined temporal period.

4. The method of claim 2, further comprising obtaining visible images from a visible spectrum camera and using information in the visible spectrum camera to check accuracy of the count.

5. The method of claim 4, wherein information from the visible spectrum camera includes motion information, a time attribute, and location features.

6. The method of claim 5, further comprising communicating metadata to a data center.

7. The method of claim 2, further comprising reporting the scene population count, statistics or complementary data.

8. The method of claim 1, further comprising:
    obtaining multiple frames of depth data from the depth sensor; and
    tracking, from frame to frame of the multiple frames of depth data, one or more foreground objects determined to match the reference model from among the foreground objects.

9. The method of claim 1, further comprising imaging the scene using the depth sensor.

10. A non-transitory computer readable medium having program instructions stored thereon, the program instructions being executable by a processor and, when loaded and executed by the processor, causing the processor to:
    obtain a frame of depth data from a depth sensor, the depth sensor mounted to provide a top view of a scene;
    identify a given foreground object, from among multiple foreground objects and background objects, from within the frame of depth data,
    for a given foreground object, calculate expected relative head size, in pixels of the frame of depth data, of the given foreground object at a depth of the given foreground object, the expected relative head size calculated using a pre-determined head size, a width in pixel units of the frame of depth data, an angle the depth sensor covers, and a depth of the given foreground object determined using the frame of depth data obtained;
    determine if the given foreground object matches a single-scale reference model of a target object, the single-scale reference model of the target object determined based upon the expected relative head size at the depth of the foreground object;
    apply a machine learning application to generate a classification determination of the foreground object; and
    maintain a classification determination count,
    wherein the expected relative head size is calculated according to the following equation:

$$R = \frac{rM}{2 * X \tan\left(\frac{\alpha}{2}\right)}$$

where
    R is the expected relative head size in pixels,
    r is an average head radius,
    α is the angle the depth sensor covers,
    X is a distance from the depth sensor to a head center, and
    M is an image width.

11. A system, comprising:
a depth sensor configured to image depth of objects to acquire depth data;
a memory, in communication with the depth sensor, configured to store the depth data;
a processor, in communication with the memory, configured to execute program instructions that cause the processor to:
obtain a frame of depth data from the depth sensor, the depth sensor mounted to provide a top view of a scene;
discern foreground objects from background objects from within the frame of depth data;
for a given foreground object, calculate expected relative head size, in pixels of the frame of depth data, of the given foreground object at a depth of the given foreground object, the expected relative head size calculated using a predetermined head size, a width in pixel units of the frame of depth data, an angle the depth sensor covers, and a depth of the given foreground object determined using the frame of depth data obtained; and
determine if the given foreground object matches a single-scale reference model of a target object, the single-scale reference model of the target object determined based upon the expected relative head size at the depth of the foreground object,
wherein the expected relative head size is calculated according to the following equation:

$$R = \frac{rM}{2 * X \tan\left(\frac{\alpha}{2}\right)}$$

where
R is the expected relative head size in pixels,
r is an average head radius,
α is the angle the depth sensor covers,
X is a distance from the depth sensor to a head center, and
M is an image width.

12. The system of claim 11, wherein the processor is further configured to:
define properties of a detection window based on the expected relative head size; and
generate a scene population count based on application of the detection window to the given foreground object.

13. The system of claim 12, wherein the processor is further configured to reset the scene population count to zero in an event of no motion within a scene for a predetermined temporal period.

14. The system of claim 12, wherein the processor is further configured to obtain visible images from a visible spectrum camera and use information in the visible spectrum camera to check accuracy of the count.

15. The system of claim 14, wherein information from the visible spectrum camera includes motion information, a time attribute, and location features.

16. The system of claim 15, wherein the processor is further configured to communicate metadata to a data center.

17. The system of claim 12, wherein the processor is further configured to report the scene population count, statistics or complementary data.

18. The system of claim 11, wherein the processor is further configured to:
obtain multiple frames of depth data from the depth sensor; and
track, from frame to frame of the multiple frames of depth data, one or more foreground objects determined to match the reference model from among the foreground objects.

19. The system of claim 11, wherein the processor is further configured to image the scene using the depth sensor.

* * * * *